United States Patent
Hamabata

Patent Number: 5,797,644
Date of Patent: Aug. 25, 1998

[54] WEATHER STRIP FOR A MOTOR VEHICLE

[75] Inventor: Mitsuo Hamabata, Aichi-ken, Japan

[73] Assignee: Toyoda Gosei Co., Ltd., Aichi-ken, Japan

[21] Appl. No.: 656,935

[22] Filed: Jun. 3, 1996

[30] Foreign Application Priority Data

Jun. 2, 1995 [JP] Japan ................ 7-159979

[51] Int. Cl.⁶ .................................................. B60J 10/08
[52] U.S. Cl. .................................................. 296/146.9
[58] Field of Search ........................ 296/146.9, 93; 52/716.5

[56] References Cited

U.S. PATENT DOCUMENTS

| | | |
|---|---|---|
| 4,374,880 | 2/1983 | Mesnel .................. 52/716.5 |
| 4,496,186 | 1/1985 | Tuchiya et al. |
| 4,653,801 | 3/1987 | Shirasu et al. |
| 4,678,227 | 7/1987 | Castagno |
| 5,099,612 | 3/1992 | Hayashi et al. |
| 5,127,193 | 7/1992 | Okada et al. |
| 5,240,664 | 8/1993 | Hayashi et al. |
| 5,311,702 | 5/1994 | Moore ................... 296/146.9 |
| 5,367,830 | 11/1994 | Omura et al. |
| 5,376,319 | 12/1994 | Arima |
| 5,446,998 | 9/1995 | Arima |
| 5,456,049 | 10/1995 | Goto et al. ................ 296/93 |

FOREIGN PATENT DOCUMENTS

| | | | |
|---|---|---|---|
| 404118324 A | 4/1992 | Japan ................ | 296/146.9 |
| 2279985 | 1/1995 | United Kingdom ...... | 296/146.9 |

Primary Examiner—Gary C. Hoge
Attorney, Agent, or Firm—Cushman Darby & Cushman IP Group of Pillsbury; Madison & Sutro

[57] ABSTRACT

A weather strip includes a front portion, a rear portion and a transforming portion. A trim portion is attached to a drip channel of a vehicle door assembly, and a connecting web connects the trim portion to a tubular sealing portion. The connecting web has a width which gradually varies according to the part of the vehicle door assembly to which it is attached. The part of the tubular sealing portion attached to the drip channel from the rear roof line to the upper rear pillar of the door assembly is deformed, and a contacting portion thereof is fixed at an outside trim portion.

15 Claims, 7 Drawing Sheets

WEATHER STRIP FOR A MOTOR VEHICLE

The priority application, Japanese Patent Application No. Hei. 7-159979, filed in Japan on Jun. 2, 1995, is hereby incorporated herein by this reference.

BACKGROUND OF THE INVENTION

(1) Field of the Invention

The present invention relates to a weather stripping, and more particularly to a roof line weather stripping that is attached about doors of the vehicle and between a front pillar, a rear pillar and the roof line.

(2) Description of Related Art

Figure 1:
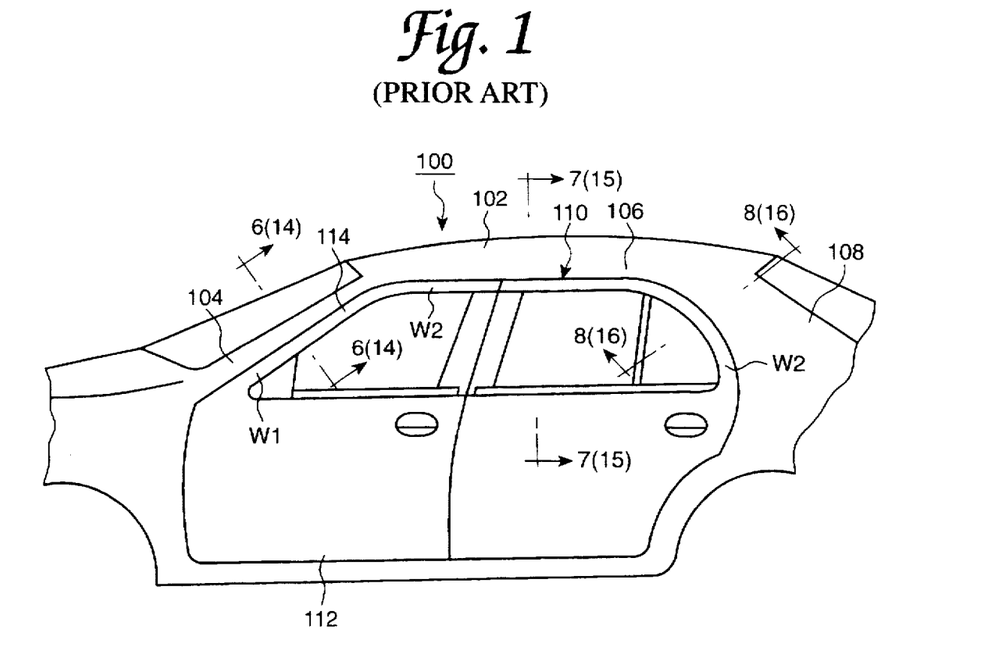
FIG. 1 is a side view of a motor vehicle.
Figure 2:
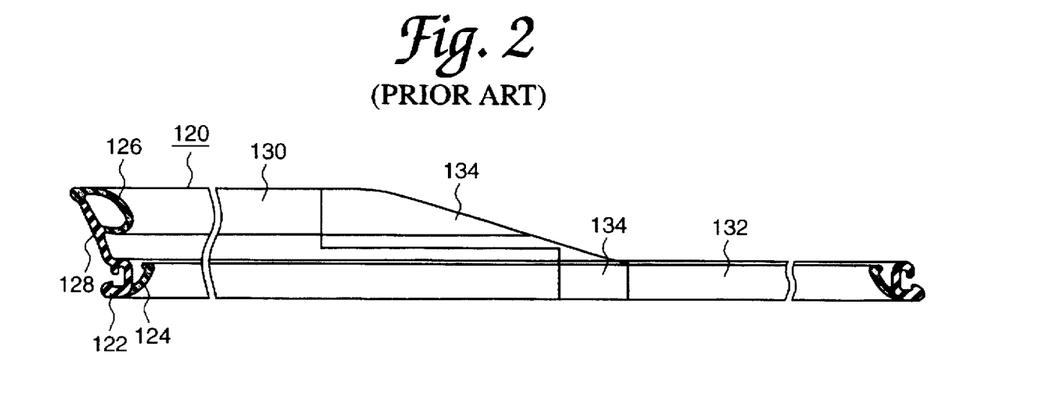
FIG. 2 is a front view of a conventional weather strip.
Figure 3:
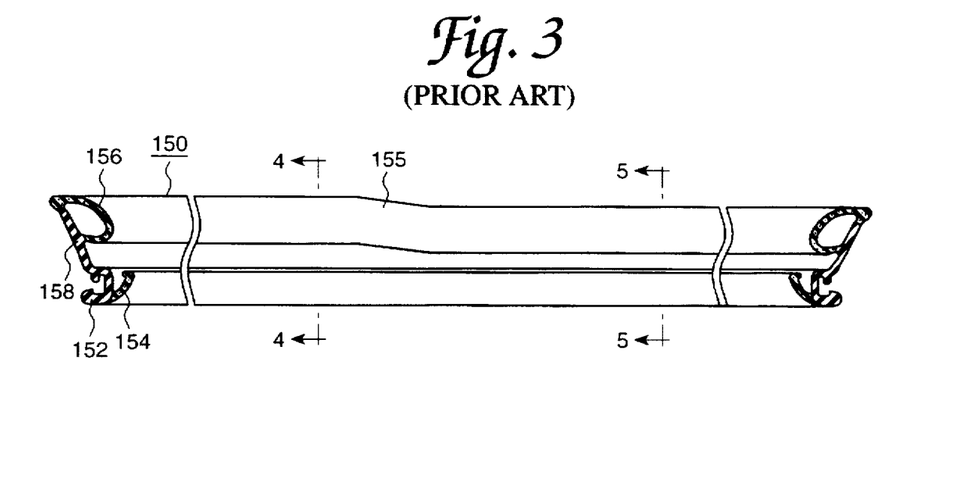
FIG. 3 is a front view of another conventional weather strip.

As shown in FIGS. 1 to 2, a vehicle body 102 has a drip channel 110 that extends along a front pillar 104, a roofline 106 and a rear pillar 108. A weather strip 120 is attached on the drip channel 110.

The weather strip 120, as in FIG. 2, includes a trim portion 122 that is used to attach the weather strip 120 on the drip channel 110. The weather strip 120 also includes a sealing lip 124, that will touch an inner surface of a door frame 114, and a tubular sealing portion 126. The tubular sealing portion 126 is connected to the trim portion 122 through a connecting web 128 which is necessary to close a gap that would otherwise exist between the door frame 114 and the front pillar 104. Where such a gap is allowed to remain unsealed and open, a whistling noise can be produced. Meanwhile, the tubular sealing portion 126 is not necessary along the roof line 106 and the rear pillar 108. It is not necessary due to the gap that receives water from the roof along the roof line 106 and the rear pillar. The weather strip 120 includes a front portion 130 that includes a tubular sealing portion 126 and a rear portion 132 that extends in the rear direction thereof, with both of front portion 130 and rear portion 132 being extruded in series. The ends of each of portions 130,132 are joined by a molding joining portion 134. It increases cost and time that first, the portions 130,132 are extruded and, then joined to each other.

Another conventional weather strip 150 is shown in FIGS. 3 to 9. The weather strip 150 includes a trim portion 152, a sealing lip 154, a tubular sealing portion 156, a connecting web 158 and a transforming section 155. During extrusion, a size of the connecting web 158 is changed at the transforming section 155. The weather strip 150 does not need to be molded to other separately extruded portions 130,132.

Figure 4:
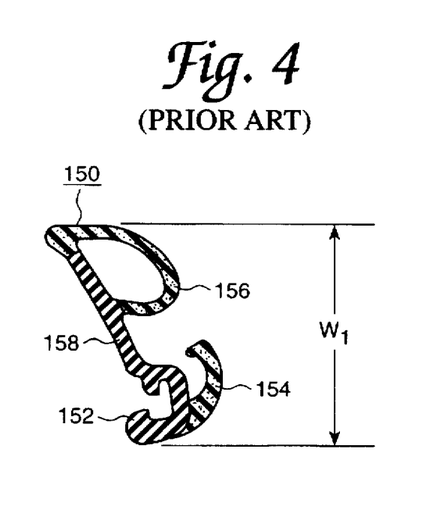
FIG. 4 is a cross-sectional view of the conventional weather strip of FIG. 3 taken along line 4—4 of FIG. 3.
Figure 5:
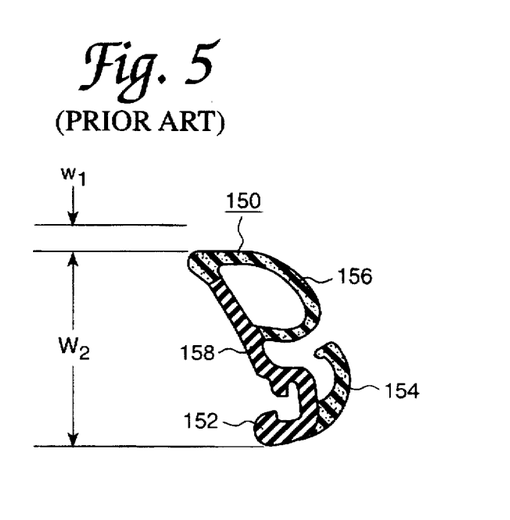
FIG. 5 is a cross-sectional view of the conventional weather strip of FIG. 3 taken along line 5—5 of FIG. 3.
Figure 6:
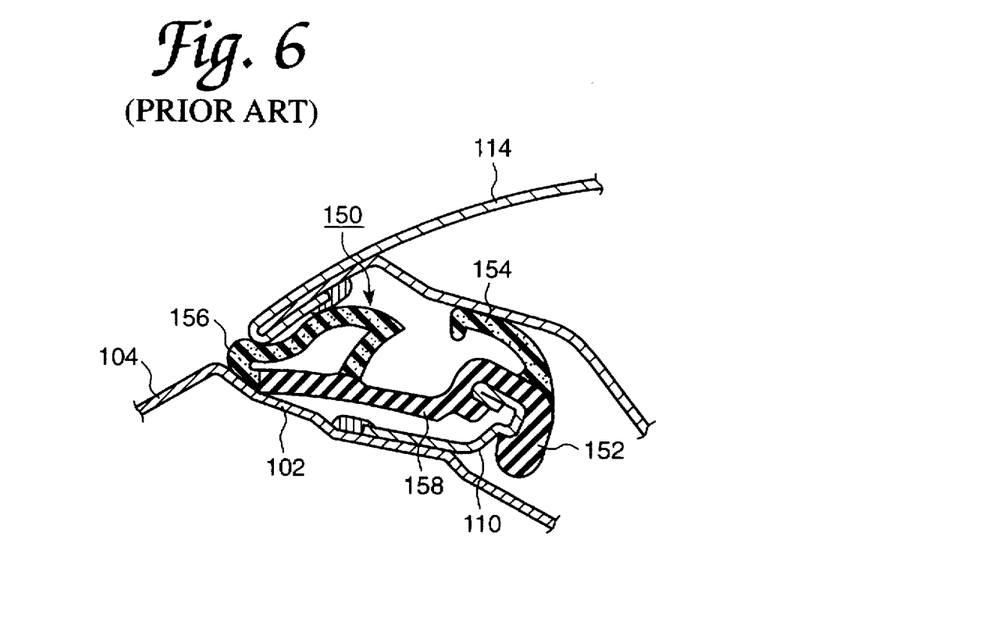
FIG. 6 is a cross-sectional view of a conventional weather strip taken along line 6—6 of FIG. 1.
Figure 7:
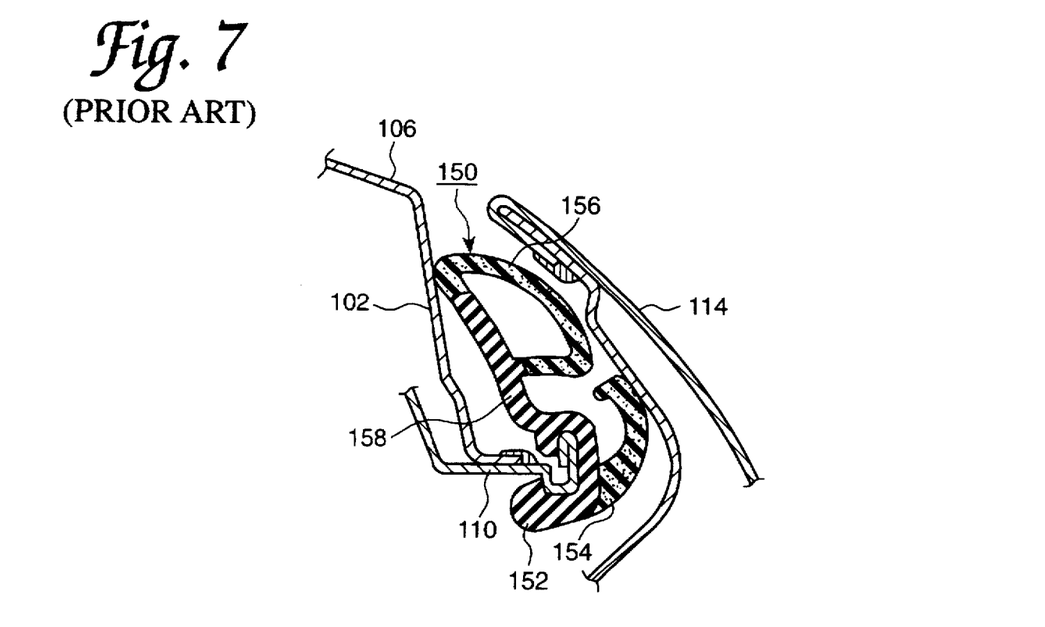
FIG. 7 is a cross-sectional view of a conventional weather strip taken along line 7—7 of FIG. 1.

The tubular sealing portion 156 closes the gap between an edge of the door frame 114 and the body 102 along the front pillar 104 as in FIG. 6, because otherwise the gap at the front pillar would produce a whistling noise. Meanwhile, the tubular portion 156 doesn't close the gap between the edge of the door frame 114 and the body 102 along the roof line 106 and the rear pillar 108, because a roof line side gap is needed to catch water from a roof as shown in FIG. 7. Therefore, as shown in FIGS. 4 and 5 a width W1 of the front portion 130 is wider than a width W2 of the rear portion 132 by a dimension "w1".

Figure 9:
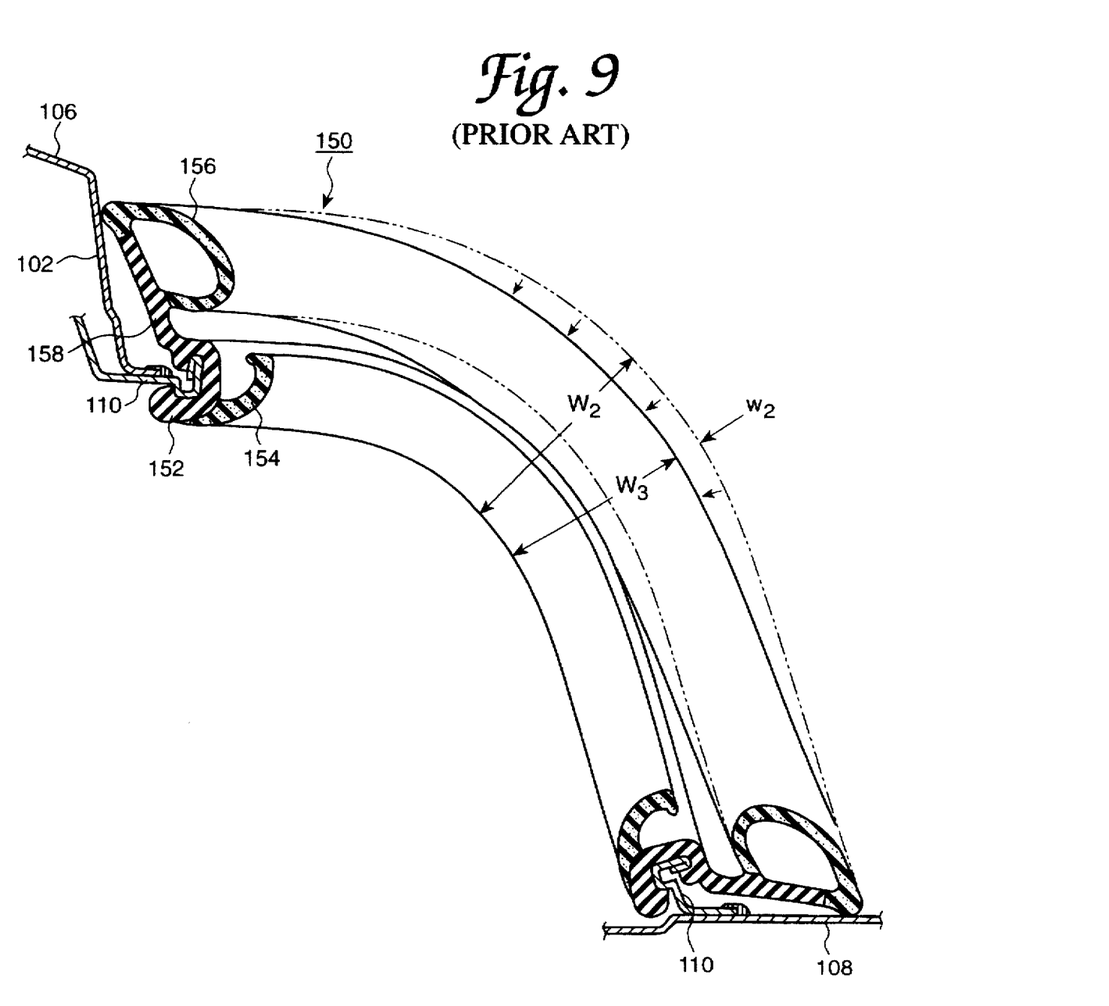
FIG. 9 is a front view of a part of another conventional weather strip which is attached along a rear roof line and an upper rear pillar of a motor vehicle body.

However, the weather strip 150 has a problem. As shown in FIGS. 1 and 9, the drip channel 110 is curved from the rear portion of the roof line 106 to the upper portion of the rear pillar 108. The weather strip 150 is attached along the curved drip channel 110. At this time, as shown in the FIG. 9, the tubular sealing portion 156 is deformed as it bends around the curve and moves inwardly. Then, the width w2 of the curved portion of the rear portion 132 is narrower than the width W2 of the strait portion of the rear portion 132 by the dimension "w2".

Figure 8:
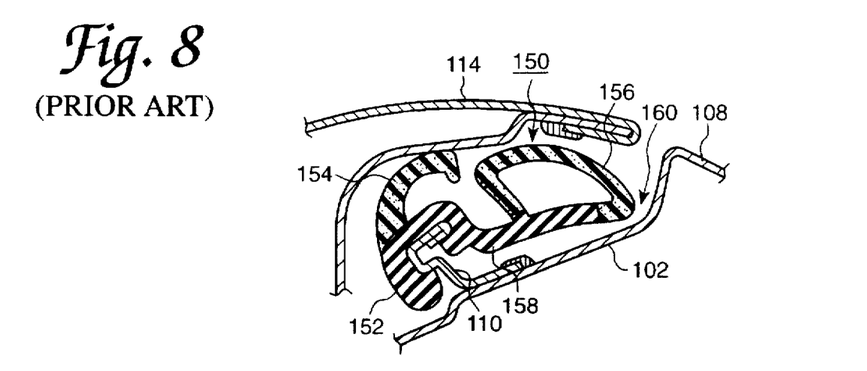
FIG. 8 is a cross-sectional view of a conventional weather strip taken along line 8—8 of FIG. 1.

There is a gap 160 between the body 102 and the weather strip 150 because the curved tubular sealing portion 156, deformed and moving inwardly, is thereby, detached from the body 102, as shown in the FIG. 8. Such a gap is unattractive and therefor, undesirable.

SUMMARY OF THE INVENTION

It is an object of the present invention to provide a weather strip that can be properly attached on a drip channel, along a front pillar, a rear pillar and a roof line of a motor vehicle body.

The weather strip of the present invention is composed of a trim portion attached to the drip channel, a tubular sealing portion and a connecting web connecting the trim portion and the tubular sealing portion. A part of the tubular sealing portion, which the weather strip is curved and attached on the curved drip channel, is deformed toward the trim portion and secured to the surface of the trim portion.

This weather strip is extruded continuously as a unit. The weather strip is made of rubber, for example EPDM or EPM rubber. The weather strip is made of solid rubber, or the trim portion and the connecting web are made of solid rubber and the tubular sealing portion is made of sponge rubber. Good sealing ability and good weather resistance are provided by using these types of rubber.

The tubular sealing portion is deformed and secured on the trim portion after extrusion and before vulcanization of the weather strip. Therefore, after vulcanization of the weather strip, the deformed desired shape and secured condition of the tubular sealing portion are maintained.

Therefore, when the weather strip expands at a curve portion, the desired shape of the deformed tubular sealing portion is maintained. The desired width of the weather strip is kept because the deformed tubular sealing portion stands firm against moving inwardly. Furthermore, the deformed tubular sealing portion securely contacts the surface of the body and no gap is created. Therefore, the weather strip of the present invention looks better. If an expanded force of the weather strip is different at the different portion when it is attached on the body, the deformed tubular sealing portion maintains the desired shape and function.

DESCRIPTION OF THE PREFERRED EMBODIMENT

Figure 11:
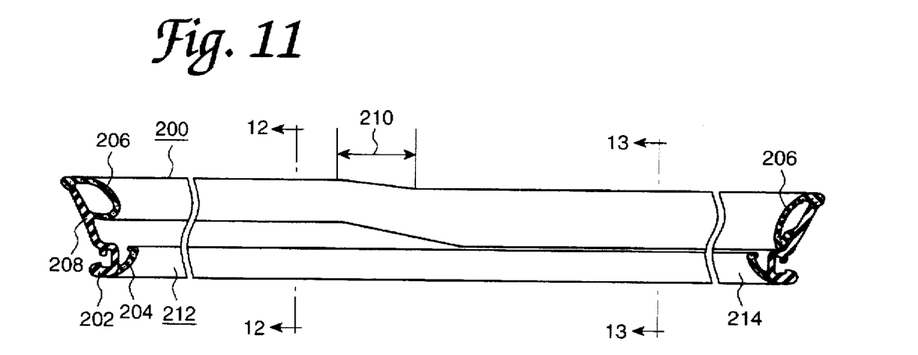
FIG. 11 is a front view of the embodiment of the weather strip.
Figure 12:
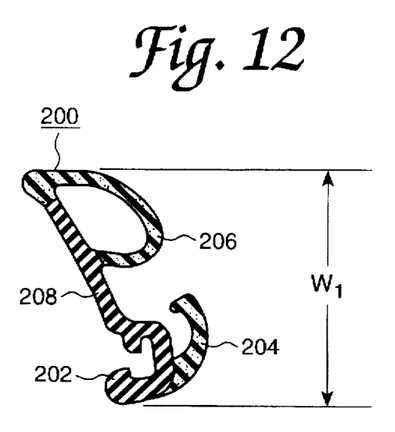
FIG. 12 is a cross-sectional view of the embodiment of the weather strip taken along line 12—12 of FIG. 11.
Figure 13:
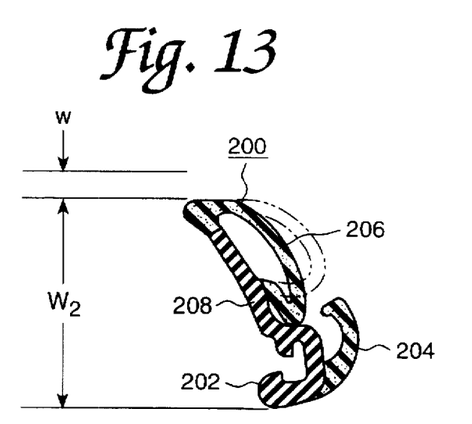
FIG. 13 is a cross-sectional view of the embodiment of the weather strip taken along line 13—13 of FIG. 11.
Figure 14:
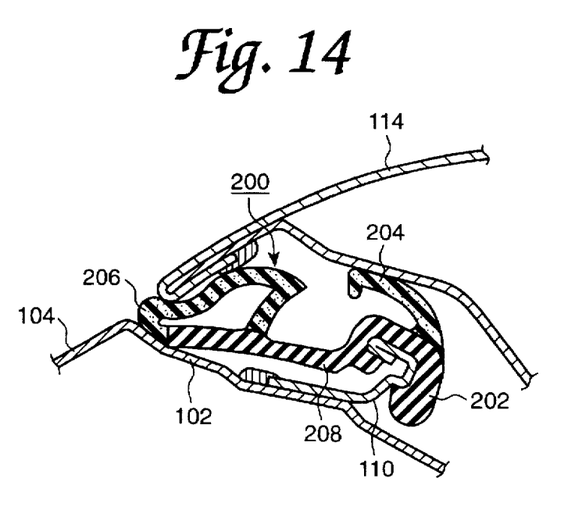
FIG. 14 is a cross-sectional view of the embodiment of the weather strip taken along line 14—14 of FIG. 1.
Figure 15:
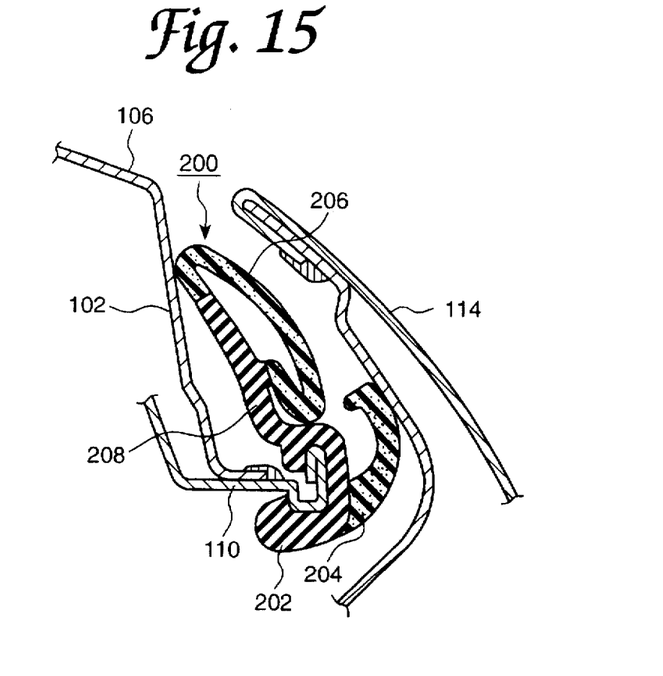
FIG. 15 is a cross-sectional view of the embodiment of the weather strip taken along line 15—15 of FIG. 1.
Figure 16:
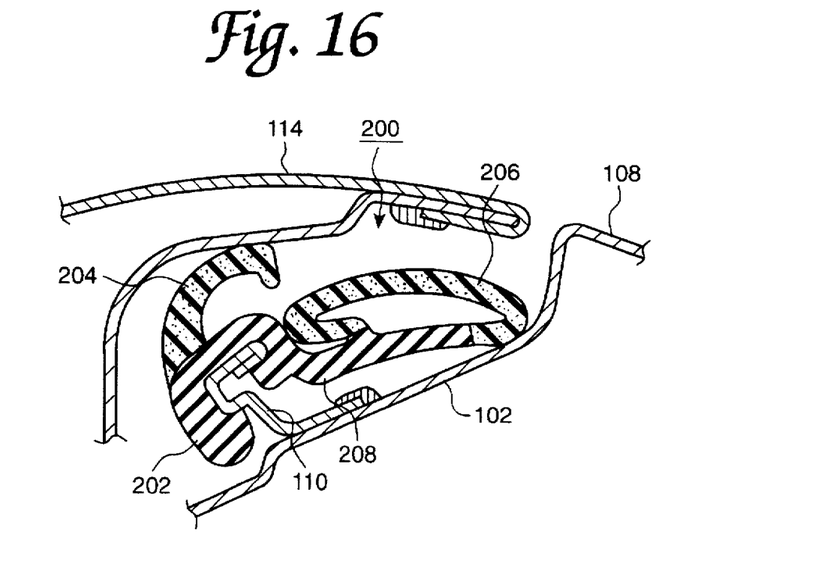
FIG. 16 is a cross-sectional view of the embodiment of the weather strip taken along line 16—16 of FIG. 1.

As shown in FIGS. 10 and 14–16, this embodiment of the weather strip 200 is attached on a drip channel 110, along a front pillar 104, a rear pillar 108 and a roof line 106 of a body 102. As shown in FIGS. 11, 12 and 13, the weather strip 200 includes a front portion 212, attached at the front pillar 104, and a transforming portion 210 between the front portion 212 and the rear portion 214. The weather strip 200 also comprises a C-shaped trim portion 202 attached on an outer flange of a drip channel 110 and a sealing lip 204 projecting toward a door frame 114 from the trim portion 202 and touching the inside surface of the door frame 114. Weather strip 200 also comprises an arc-shaped tubular sealing portion 206 and a connecting web 208 that connects the tubular sealing portion 206 and the trim portion 202. The trim portion 202 and the connecting web 208 can preferably be made of solid rubber. The sealing lip 204 and the tubular sealing portion 206 can preferably be made of sponge rubber Further, the weather strip 200 is preferably composed of an integrally extruded body from a multi-channel extrusion head.

The width of connecting web 208 is different along different part of the weather strip 200. As weather strip 200 is extruded, the connecting web 208 gradually becomes narrower at the transforming portion 210 that will be attached on a front corner portion of the upper front pillar 104 and the adjacent roof line 106. The width W1 of the connecting web 208 of the front portion 212 that is attached on the front pillar 104 is formed than the width W2 of the rear portion 214 so that the tubular sealing portion 206 will close a gap between the end of the door frame 114 and the front pillar 104. This is because if the gap exists between the door frame 114 and the front pillar 104, a whistling noise can be produced.

Meanwhile, the width W2 of the connecting web 208 of the rear portion 214, attached to the roof line 106 and the rear pillar 108 is shorter than the width W1 of the front portion 21 attached to the front pillar 104 by the dimension "w" as shown in FIGS. 12 and 13. The tubular sealing portion 206 doesn't close the gap among the end of the door frame 114, the roof line 106 and the rear pillar 108, because it is necessary for the gap to receive water from the roof.

As shown in FIG. 11, the width is changing from W1 to W2 in the transforming portion 210 of the weather strip 200. During extrusion of the transforming portion 210, a die of an extrusion head moves and the connecting web 208 becomes shorter. Therefore, the shape of the weather strip 200 changes from the shape of the front portion 212 as in FIG. 4 to the shape of the rear portion 214 as in FIG. 5.

The tubular sealing portion 206 of the rear portion 214, attached on the roof line 106 and the rear pillar 108, is deformed toward the trim portion 202 and a contact portion 216 of the tubular sealing portion 206 is fixed to an outside trim portion 218 when the weather strip 200 is manufactured. After extrusion of the weather strip 200 but before vulcanization of it, the tubular sealing portion 206 is deformed by contact with two rollers (not shown) that modify the portion 206 from the dot-line shape to the solid line shape as in FIG. 13. As a result, the contact portion 216 is fixed to the outside trim portion 218. After that, the weather strip 200 is vulcanized. As a result of the vulcanization, the deformed and fixed desired shape of the tubular sealing portion 206 of the weather strip 200 is maintained. The deformed and fixed desired shape of the tubular sealing portion 206 starts in the transforming portion 210 where the connecting web 208 width changes gradually, and also the deformed and fixed desired shape of the tubular sealing portion 206 may start from a first portion attached to the roof line 106 after the transforming portion 210.

The deformation rate of a sectional square of the tubular sealing portion 206 is more than 30 percent of tubular sealing portion 206. That rate is preferably between 40 and 60 percent of tubular sealing portion 206.

Figure 10:
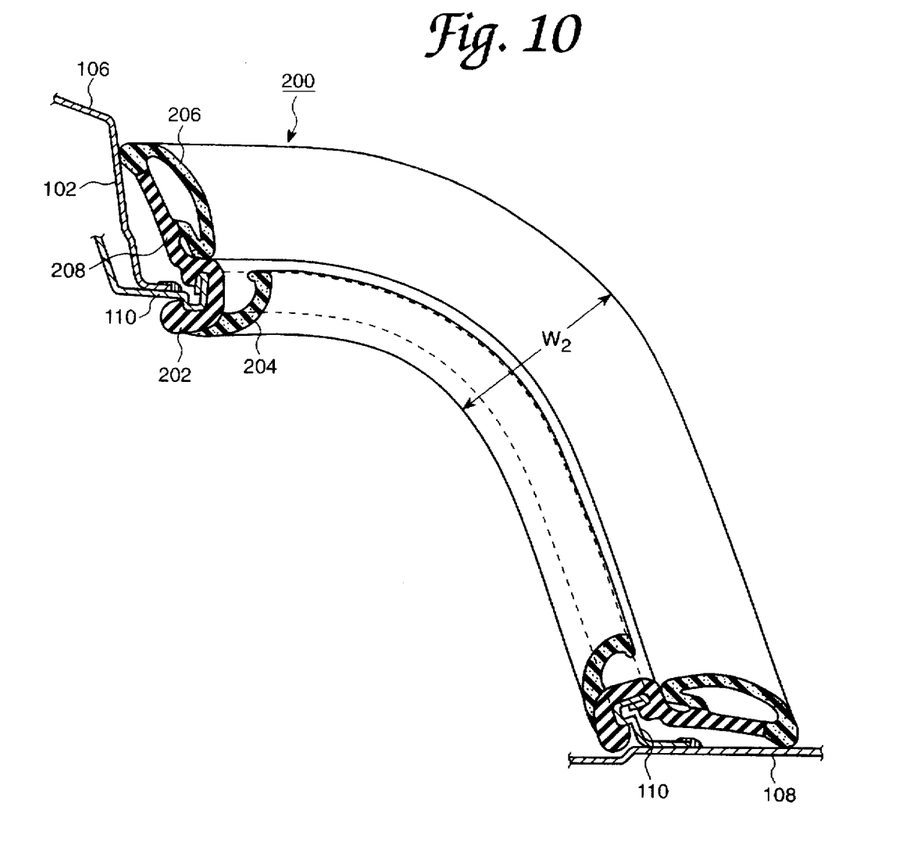
FIG. 10 is a front view of a part of an embodiment of a weather strip provided according to the principle of the present invention, where the weather strip is attached along a rear roof line and an upper rear pillar of a motor vehicle body.

As shown in FIG. 10, the weather strip 200 is attached along the curved drip channel 110, which curves from the rear end of the roof line 106 to the upper end of the rear pillar 108. Though the curved tubular sealing portion 206 is expanded especially outside of the weather strip 200, the tubular sealing portion 206 holds out against moving the tubular sealing portion 206 and does not deform toward the inside curve so that the contact portion 216 of the deformed tubular portion 206 is fixed at the outside trim portion 218. Therefore, the width W2 of the weather strip 200 is maintained and the tubular sealing portion 206 securely contacts on the surface of the body. Also, the weather strip 200 looks better than the prior art. If the expanded force of the weather strip 200 is different when attached to the roof line 106, the deformed tubular portion 206 doesn't have any effect. The width W2 of the weather strip 200 is also maintained. When the tubular sealing portion 206 is curved, the tubular sealing portion 206 isn't deformed to raise a surface of the body 102. Again, the weather strip 200 is also better looking than the prior art.

This invention is not limited the above embodiment and can vary within an area of the meaning of this invention. For example, the cross-sectional figure of the trim portion 202 and the tubular sealing portion 206 may vary. Also, this invention can use another weather strip attached at the roof directly.

What is claimed is:

1. A weather strip for use on a body to seal a gap between a door and a door opening of the body, comprising:

first and second weather strip portions integrally formed as a unit;

wherein each of said first and second weather strip portions includes a sealing portion to seal said gap, an attached portion, and a connecting web connecting said sealing portion and said attached portion, said sealing portion of said second weather strip portion is deformed to attach said attached portion at least in a curved area of the door assembly; and said sealing portion of said first weather strip portion is to close said gap and said sealing portion of said second weather strip portion is not to seal said gap.

2. The weather strip according to claim 1, wherein said first and second weather strip portions further include a sealing lip to form a seal between said door and said body.

3. The weather strip according to claim 2, wherein widths of said connecting webs gradually decrease between said first and second weather strip portions.

4. The weather strip according to claim 2, wherein said sealing portions have a tubular cross-sectional configuration.

5. The weather strip according to claim 2, wherein said first and second strip portions are one extruded composition.

6. The weather strip according to claim 2, wherein said sealing portions are made of sponge rubber, and said attached portions and said connecting webs are made of solid rubber.

7. A weather strip for use on a body to seal a gap between a door and a door opening of the body, comprising:

first and second weather strip portions integrally formed as a unit;

wherein each of said first and second weather strip portions includes a sealing portion to seal said gap, an attached portion, and a connecting web connecting said sealing portion and said attached portion, said sealing portion of said second weather strip portion is deformed to attach said attached portion of said second weather strip portion at least in a curved area;

said sealing portion of said first weather strip portion is to close said gap and said sealing portion of said second weather strip portion is not to seal said gap; and widths of said connecting webs of said first and second weather strip portions gradually decrease between said first and second weather strip portions.

8. A weather strip for use on a body to seal a gap between a door and a door opening of the body, comprising:

first and second weather strip portions integrally formed as a unit;

wherein each of said first and second weather strip portions includes a sealing portion, made of sponge rubber, to seal said gap, an attached portion made of solid rubber, and a connecting web, made of solid rubber, connecting said sealing portion and said attached portion, and said sealing portion of said second weather strip portion is deformed to attach said attached portion of said second weather strip portion at least in a curved area.

9. A weather strip for use on a body to seal a gap between a door and a door opening of the body, the weather strip comprising:

first and second strip portions, the first and second strip portions being integral with one another;

wherein each of the first and second strip portions includes sealing means for sealing a gap between a door and a door opening of a body, attachment means for attaching to a portion of one of the door and the door opening, and a connecting web connecting the sealing means and the attachment portion;

the sealing means of the second strip portion is, relative to the sealing means of the first portion, deformed; and the attachment means of the second strip portion is further for attaching to a curved portion of said one of the door and the door opening due to deformation of the sealing means of the second strip portion.

10. The weather strip according to claim 9, wherein the first and second strip portions further include a sealing lip to form a seal between the door and the body.

11. The weather strip according to claim 9, wherein the sealing means of the first strip means is for closing a gap between a door and a door opening of a vehicle and the sealing means of the second strip is further for not sealing the gap.

12. The weather strip according to claim 9, wherein widths of the connecting webs gradually decrease between the first and second strip portions.

13. The weather strip according to claim 9, wherein each of the sealing means has a tubular cross-section.

14. The weather strip according to claim 9, wherein the first and second strip portions are one extruded composition.

15. The weather strip according to claim 9, wherein each of the sealing means is made of sponge rubber, and each of the attachment means and the connecting web is made of solid rubber.

* * * * *